Aug. 29, 1967  E. H. E. JASTER  3,338,285
PACKAGE OR WRAPPER OF PLASTIC MATERIAL
Filed Nov. 23, 1964  3 Sheets-Sheet 1

United States Patent Office 3,338,285
Patented Aug. 29, 1967

3,338,285
PACKAGE OR WRAPPER OF PLASTIC MATERIAL
Erich Hermann Ernst Jaster, deceased, late of Nurnberg, Germany, by Margarete J. Jaster, Nurnberg, and Renate E. Schoepe, Bubenheim, Koblenz, Germany, heirs, assignors to ASF Gleitverschulss GmbH, Nurnberg, Germany
Filed Nov. 23, 1964, Ser. No. 413,378
Claims priority, application Germany, Nov. 23, 1963, J 24,790
8 Claims. (Cl. 150—3)

This invention relates to a package or wrapper of plastic material, which can be closed and opened by a pressure-operable fastener.

Packages of plastic materials are increasingly required to serve as durable or re-usable packages. This applies, e.g., to packages for corsets for ladies, bathing suits, pullovers, bed and table linen, small parts of iron or other materials, sample sets, e.g., of shutter blades, toys, foodstuffs, medicines, or for cosmetic purposes and also of material in paste form. Such a package must be capable of being opened and closed in a simple manner so that it can keep a remaining part of its original contents or another material or, after some time, the same contents.

The invention relates to wrappers of all kinds, where several problems may arise. This applies, e.g., to wrappers for bundles of cables, particularly in telephone installations. The wrappers may also be used for the protection and covering of any desired type, e.g., of polyvinylchloride, for protection against insects, or coverings for pipes insulated against cold or heat.

A package of plastic material is known, which consists preferably of a length of thermoplastic tubing formed with transverse seam welds and provided with two profiled strips, which are attached to the inside of the tube length and hooked one into the other by the application of pressure. The result is a packing which consists of plastic material and has been formed from a thermoplastic tube length and closed by seam welds, and which can be opened when required and can be closed in a simple manner when a desired amount of its content has been removed.

A recent printed publication describes a bag having walls which consist of plastic material sheeting and provided close to its edge between the opposite inside surfaces of its walls with male and female fastener elements, which may be interengaged. The dimensions and/or shapes of these elements are selected so that the resistance offered by them against their separation by a pressure exerted by the bag is a multiple of the force which is required to cause them to interengage or to separate them by an action exerted from the outside on the edges of the walls. This description of the previously disclosed bag defines only a problem without teaching a solution to a person skilled in the art. When the subject matter of said prior publication is ascertained from the contents of the specification, the solution to the problem set forth is recognized in that the head of a rib forms an asymmetric, additional thickness, which affords hook surfaces which are disposed on both sides of the base and interengageable with the associated edges of a groove. That hook surface which is disposed on the inside of the bag has a greater inclination from the wall of the bag than the hook surface disposed on the outside of the bag.

The present invention differs from the described state of the art as regards the problem set forth and the means provided in solution thereto. It is based on the packages of plastic materials which have been described initially hereinbefore, which may be provided with any known sliding or pressure-operable fasteners. The catches of these known sliding or pressure-operable fasteners are symmetric on both sides of their axial plane which is at right angles to the walls of the package or wrapper. According to the invention, these known packages are further improved according to the invention so as to solve the problem which will now be set forth.

Whereas the known bag described last hereinbefore is based on the suggestion to provide the catch with an unsymmetrical head which is thicker on the side facing the interior of the bag, in order to increase the resistance presented to a force which is caused by the internal pressure of the bag, the invention is based on the recognition that the known catch fastener elements are sufficient to present the desired resistance to a force produced by the internal pressure. Hence, the problem underlying the invention resides in the first place in the provision of an all-purpose fastener, which can be used in like manner for all applications, as far as possible. To provide a permanent or re-usable package, it is necessary in the first place to solve the problem that the opening of the fastener should be facilitated whereas its retaining function should not be adversely affected. It would be inconsistent with this requirement to increase the interengagement on the side facing the interior of the bag. At the same time, it is an object of the invention to improve the retaining function of the fastener without adversely affecting the desired, easier opening. For this purpose, an arrangement is provided in which a force which is generated by a push or impact on the contents of the package and tends to open the fastener is initially obstructed and after attenuation is transmitted to the actual interengaging sections. Finally, as the fasteners are to be used in durable or re-usable packages, they must be designed so that the continued function of the fastener will not be adversely affected even by a pulverulent contents. Finally, consideration is to be given to those applications in which the contents of the package consists, e.g., of corrosive, poisonous or the like powders, which must be protected from being taken by unauthorized persons, particularly children. In such cases, provision must be made for increasing the resistance to an opening of the fastener from the outside.

In a package or wrapper consisting of plastic material and belonging to the type initially described hereinbefore, the problems set forth are solved according to the invention in that at least one of the fastener elements has such a three-dimensional shape that the fastener is resiliently yieldable as a result of a partial, preferably eccentric weakening of the cross-section. In a development of the invention, that fastener element which carries the keeper of the interengaging elements has a shoulder, which is enlarged on one side. All problems set forth initially hereinbefore can be solved with the aid of the described features of the invention used individually or in combination.

There are various embodiments of the three-dimensional shape of one fastener element or the other or of both fastener elements so as to make the fastener resiliently yieldable by a partial, preferably eccentric weakening of the cross-section. For instance, the catch which enters the keeper may have a head, which is formed with a slot-shaped recess at the centre at its outside periphery. Alternatively, the partial weakening of the cross-section of a fastener element may be effected in that the keeper is rounded at the end which faces the pull tab. It is preferable, however, to use that embodiment in which the keeper has on its inside a slot-shaped recess, which is eccentrically offset towards the pull tab.

A fastener or closure affording a particularly good seal will be provided if the neck of the catch which enters the keeper is enlarged, and preferably tapered, and the end of the keeper has on one side an appropriately shaped, sealing and contacting surface.

In packages or wrappers having a plurality of parallel interengaging sections, the invention calls for interengaging sections which are enlarged by an overlapping shoulder on the side facing the pull tab and are provided, if desired, on the side remote from the pull tab with an overlapping shoulder which terminates on the level of the head. Where a plurality of parallel interengaging sections are used in a development of the invention, the inner interengaging sections interengage each other and are embraced by the keeper.

Illustrative embodiments of the invention will be described hereinafter with reference to the drawing.

Figure 1:
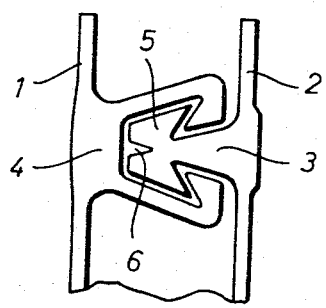
FIGURE 1 is an end view of one embodiment of the invention.

FIGURES 3–12, each illustrate an end view of a different embodiment of the invention.

In all embodiments, the walls 1, 2 of the package are provided on the inside with a catch 3 and a keeper 4, respectively. With the aid of these elements, the opposite walls of the package may be interengaged by pressure. Thus far, the fastener corresponds to the state of the art. According to the invention, the head 5 of the catch 3 is formed on its outside periphery at the centre with a slot-like recess 6. Owing to this feature, the forces resulting from the action of any sudden load on the fastener caused by pressure, tension, or impact will be initially taken up inside the fastener so that the impact is substantially reduced because the outer lateral contact surfaces of the head of the catch can yield and assume an aligned position and the slotted head can yield until the sides of the slot contact each other. The fastener is disengaged and opened only when the application of force is continued.

Figure 2:
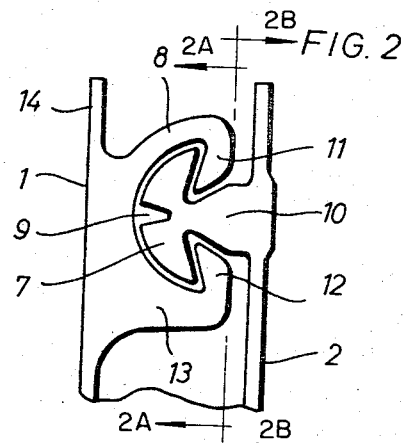
FIGURE 2 is an end view of another embodiment of the invention.
Figure 2A:
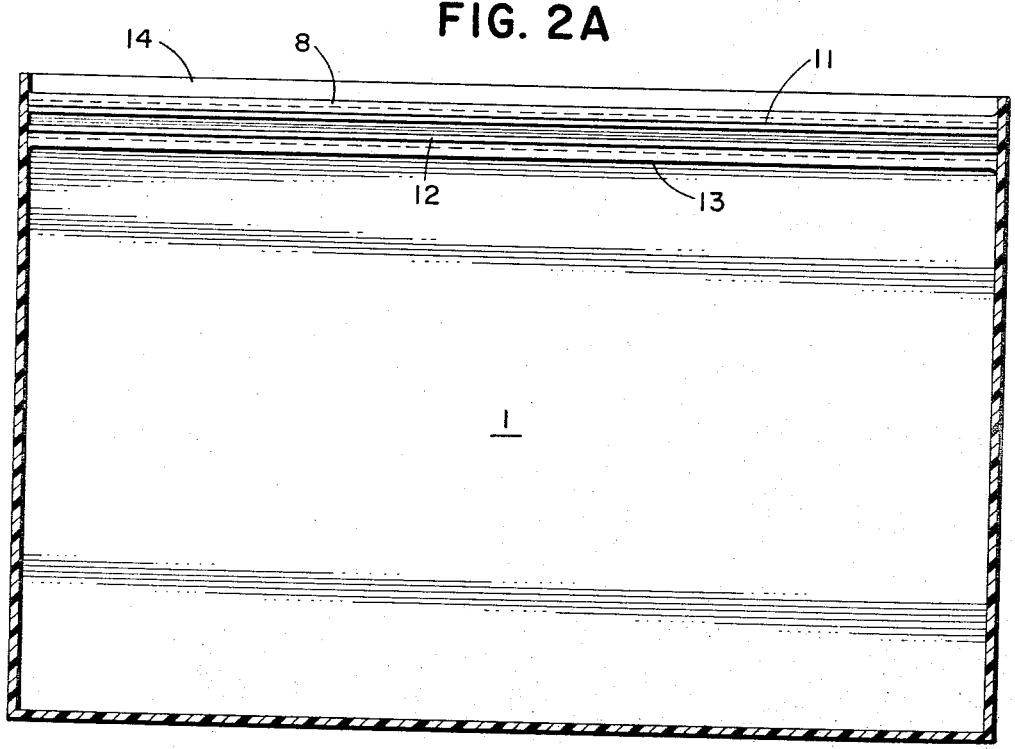
FIGURE 2A is a sectional view of an embodiment of the invention taken along lines 2A of FIGURE 2.
Figure 2B:
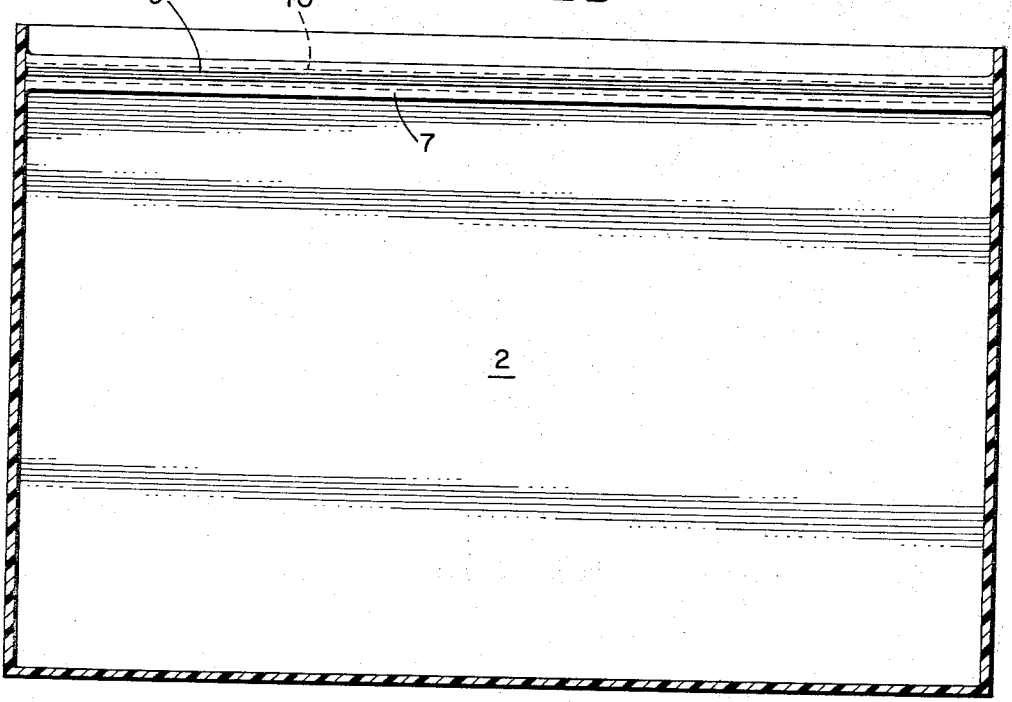
FIGURE 2B is a sectional view of an embodiment of the invention taken along lines 2B of FIGURE 2.

The embodiment shown in FIG. 2 and FIGURES 2A and 2B showing sections taken along 2A and 2B of FIGURE 2, differs from the embodiment described hereinbefore in the first place in that the catch 7 and the keeper 8 are larger and more rounded. The head of the catch 7 has again a slotlike recess 9. Besides, the stem 10 of the catch 7 is very thick and has a taper. The ends 11, 12 of the keeper 8 are provided with contact surfaces conforming to the tapered stem. According to the invention, that fastener element which carries the keeper 8 of the interengaging sections is provided with a shoulder 13, which is enlarged on one side. In the embodiment which is shown, this shoulder is provided on that side which is remote from the interior of the bag and faces the pull tab 14. This results in a reinforcement and stiffening of that half of the keeper which is disposed outside the bag. This arrangement will be chosen when an increased protection is desired against an opening of the bag by children. The thickness of the shoulder may be selected so as to provide any desired resistance to pressure. It will be understood that the shoulder 13 which is enlarged on one side may alternatively be provided on that side of the keeper 8 which is disposed inside the package, if the retaining function of the fastener is to be increased on the inside.

Figure 3:
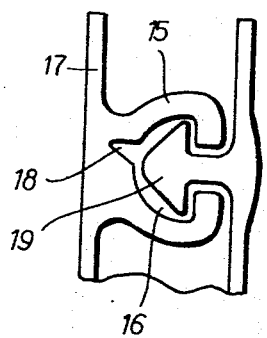

In the embodiment shown in FIG. 3, the keeper 15 has on the inside 16 a slotlike recess 18, which is eccentrically offset towards the pull tab 17. The slot may be tapered or of uniform width. As a result, a pull exerted from the outside on the pull tab 17 will cause an easy disengagement of this half of the keeper without need for a change in the cross-sectional shape of the catch 19 relative to the prior art. In this case too it would be possible, of course, to offset the slotlike recess eccentrically towards the interior of the package when it is desirable in view of the respective application to facilitate the opening of the fastener by forces exerted from the inside.

Figure 4:
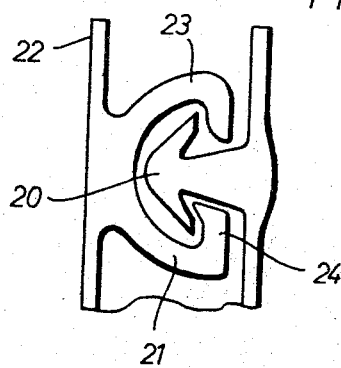

The fastener shown in FIG. 4 has also a catch 20 of known shape, which is embraced by a keeper 21. According to the invention that end 23 of the keeper 21 which faces the pull tab 22 is rounded so that the fastener can easily be opened from the pull tab side. The other half 24 of the keeper 21 conforms exactly to the catch 20 in cross-section so that a reliable retention of the elements of the fastener is ensured on this side. In this case too the fastener can be made resiliently yieldable towards one side by weakening the cross-section.

Figure 5:
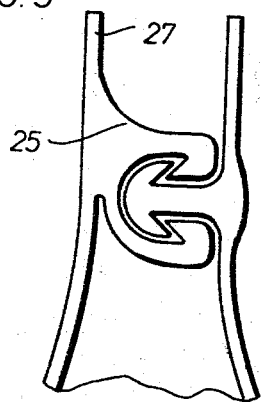
Figure 6:
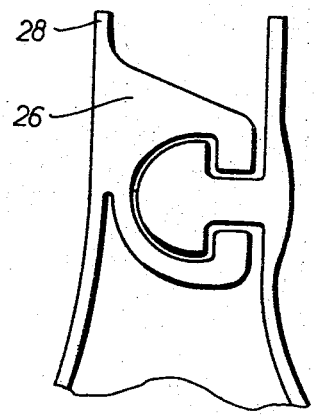
Figure 7:
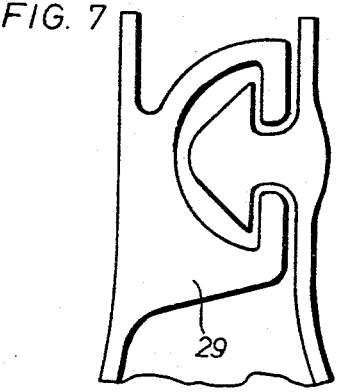
Figure 8:
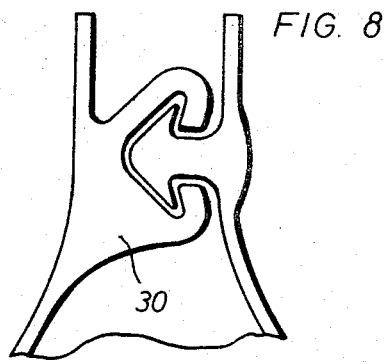

FIGS. 5, 6, 7 and 8 show further embodiments of fasteners having shoulders enlarged on one side. In FIGS. 5 and 6, the shoulders 25 and 26 enlarged on one side are disposed on that side of the fastener which faces the pull tabs 27 and 28, respectively. In FIGS. 7 and 8, the shoulders 29 and 30 reinforced on one side are disposed on the inside of the package. Catch sections as shown in FIGS. 6 and 7 will be preferred for packaging very fine powder or ground material because such contents can then be removed from the fastener elements more easily than from catch sections as shown in FIGS. 5 and 8, in which the contents may be caught in the acute-angled corners. It must be taken into account that the contents flows across the fastener elements when the package is shaken to remove its contents so that the fastener elements tend to be filled with the contents of the package and this contents cannot be removed from the fastener elements even by shaking or knocking.

An improved sealing action of the fastener or closure towards the outside is significant also for hygroscopic contents.

Figure 9:
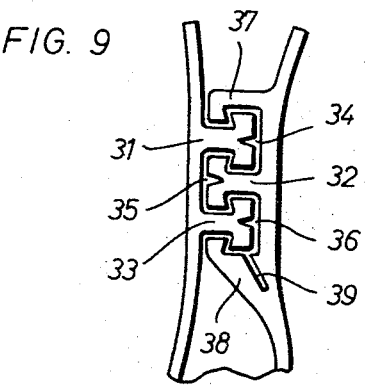
Figure 10:
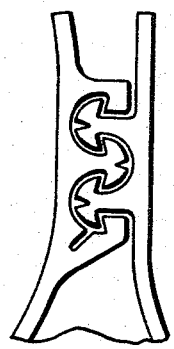

Multiple fasteners are shown in FIGS. 9 and 10. The fastener shown in FIG. 9 has three catches 31, 32, 33 having head, the end of which is trapezoidal shape. Each catch has at the centre a slotlike recess 34, 35, 36. The three catches interengage each other directly and are embraced on the outside by keepers 37, 38. The keeper 38 is provided with a slotlike recess 39. In the embodiment shown by way of example, the enlarged keeper 37 is disposed on the outside of the closure and the keeper 38 weakened by the slot 39 is disposed on the inside of the fastener. This arrangement may be inverted when this is required by the application.

FIG. 10 shows fastener elements in an arrangement which is inverted relative to FIG. 9. A further difference compared to FIG. 9 resides in that the catches have heads, the ends of which are substantially semi-circular in shape.

Figure 11:
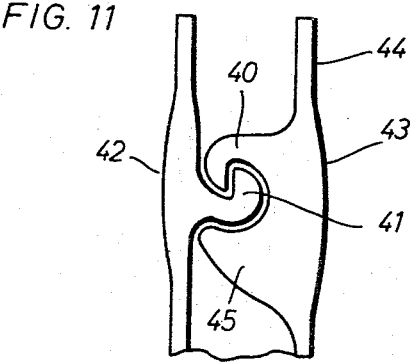
Figure 12:
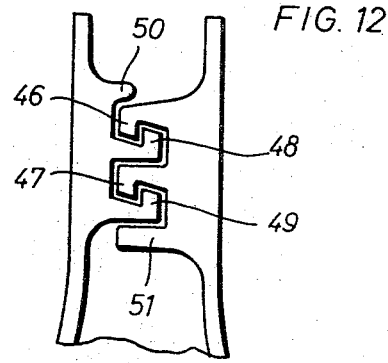

FIGS. 11 and 12 show closures in which two unilateral catches 40, 41 interengage. On the side facing the pull tab 44, the fastener elements 42, 43 are designed so that they do not present a contact surface to the catches 40 and the fastener can easily yield here to open. On the side facing the interior of the bag, the fastener element 43 has an enlarged shoulder 45, which applies against the rear side of the catch 41. This results in an improved retaining function of the fastener on this side. This arrangement may also be inverted.

The fastener or closure shown in FIG. 12 is mainly intended for packaging very fine powder or ground material. For this reason, the catches 46, 47, 48, 49 are bent at right angles. The cross-section has sharp edges so that the pulverulent contents of the package cannot be caught. The enlarged shoulder 50 provided on the outside of the fastener terminates on the level of the catch heads. On the other hand, the shoulder 51 on the inside of the fastener or closure is just as thick as the catches. In this case too the arrangement may be inverted.

In all embodiments, the package or wrapper is closed by forcing the parallel striplike keepers and catches one into the other by hand. This is possible because the catch member is stronger than the keeper member and at least one of the two striplike members is bevelled relative to the other member so that the keeper member is initially opened and its two claws are spread owing to the resiliency of the material under the pressure of the catch member which is being introduced, whereas the keeper member returns to its normal position and embraces the neck of the catch member when the latter has entered the keeper member.

The fasteners or closures according to the invention may be made separately and be subsequently applied to the package or wrapper, e.g., by adhering or welding or sewing. Alternatively, the packages or wrappers may be made from sheeting or tubing of plastic material and be provided with the fastener or closure during the extruding and/or blow-forming process.

What is claimed is:

1. A plastic container comprising at least one keeper member provided at the inner wall of said container and at least one catch member provided at an opposite inner wall of said container; said catch member adapted to be inserted in said keeper member to fasten said walls together; said keeper member including a pair of shoulders, between which said catch member extends in a fastening position, one of said shoulders having a larger cross-sectional area than the other; said catch member including a head which extends between said shoulders in said fastening position, a slot-shaped recess formed in the center of the outer periphery of said head, and a neck connected to said head, a portion of said neck partially extending between said shoulders in said fastening position.

2. A container as set forth in claim 1 wherein said keeper member and said catch member are spaced from the end of said container and at least one pull tab is formed by said walls.

3. A container as set forth in claim 1 wherein said head of said catch member has an end which is substantially semi-circular in shape.

4. A container as defined in claim 1 wherein said portion of said neck extending between said shoulders in said fastening position tapers progressively inward to the head to which it is connected.

5. A plastic container comprising a plurality of keeper members provided at the inner wall of said container and a plurality of catch members provided at an opposite inner wall of said container; said catch members adapted to be inserted in said keeper members to fasten said walls together; a pair of shoulders formed by said keeper members between which said catch members extend in a fastening position, one of said shoulders having a larger cross-sectional area than the other; each of said catch members including a head extending into one of said keeper members, and a slot-shaped recess formed in the center of the outer periphery of said head.

6. A container as set forth in claim 5 wherein said shoulder having the larger cross-sectional area is positioned adjacent the interior of said container, the other shoulder is spaced from the end of said container, and at least one pull tab is formed by said walls.

7. A container as set forth in claim 6 including an eccentrically disposed slot-shaped recess formed in the interior of one of said keeper members and extending into said shoulder having the larger cross-sectional area.

8. A container as set forth in claim 7 wherein said head included in each of said catch members has an end which is substantially semi-circular in shape.

References Cited

UNITED STATES PATENTS

| 2,610,879 | 9/1952 | Pope. | |
|---|---|---|---|
| 3,173,184 | 3/1965 | Ausnit | 24—201.3 |
| 3,203,062 | 8/1965 | Ausnit. | |

FOREIGN PATENTS

| 182,689 | 7/1955 | Austria. |
|---|---|---|
| 475,121 | 7/1951 | Canada. |
| 1,041,436 | 10/1958 | Germany. |
| 733,680 | 7/1955 | Great Britain. |
| 800,169 | 8/1958 | Great Britain. |

BERNARD A. GELAK, *Primary Examiner.*